US012083064B2

(12) United States Patent
Song et al.

(10) Patent No.: US 12,083,064 B2
(45) Date of Patent: Sep. 10, 2024

(54) EXOSKELETON FINGER REHABILITATION TRAINING DEVICE AND USAGE METHOD THEREOF

(71) Applicant: SOUTHEAST UNIVERSITY, Nanjing (CN)

(72) Inventors: Aiguo Song, Nanjing (CN); Jianwei Lai, Nanjing (CN); Huijun Li, Nanjing (CN); Jianqing Li, Nanjing (CN); Baoguo Xu, Nanjing (CN); Hong Zeng, Nanjing (CN); Jun Zhang, Nanjing (CN)

(73) Assignee: SOUTHEAST UNIVERSITY, Nanjing (CN)

(*) Notice: Subject to any disclaimer, the term of this patent is extended or adjusted under 35 U.S.C. 154(b) by 413 days.

(21) Appl. No.: 17/311,325

(22) PCT Filed: Jun. 28, 2020

(86) PCT No.: PCT/CN2020/098441
§ 371 (c)(1),
(2) Date: Jun. 5, 2021

(87) PCT Pub. No.: WO2021/012873
PCT Pub. Date: Jan. 28, 2021

(65) Prior Publication Data

US 2022/0133578 A1 May 5, 2022

(30) Foreign Application Priority Data

Jul. 24, 2019 (CN) ......................... 201910672628.9

(51) Int. Cl.
*A61H 1/02* (2006.01)

(52) U.S. Cl.
CPC ... *A61H 1/0288* (2013.01); *A61H 2201/1207* (2013.01); *A61H 2201/165* (2013.01); *A61H 2201/1659* (2013.01)

(58) Field of Classification Search
CPC .......... A61H 1/0288; A61H 2201/1207; A61H 2201/165; A61H 2201/1659;
(Continued)

(56) References Cited

U.S. PATENT DOCUMENTS 4,986,280 A * 1/1991 Marcus .................... B25J 19/02
600/595

FOREIGN PATENT DOCUMENTS

CN 105726263 A * 7/2016
CN 105796283 A * 7/2016 ........... A61H 1/0288
(Continued)

*Primary Examiner* — Tu A Vo
*Assistant Examiner* — Kelsey E Baller
(74) *Attorney, Agent, or Firm* — CBM PATENT CONSULTING, LLC

(57) ABSTRACT

A exoskeleton finger rehabilitation training device includes an exoskeleton finger rehabilitation training mechanism including a supporting base, a finger sleeve actuating mechanism, and a finger joint sleeve connected to a power output end of the finger sleeve actuating mechanism, wherein the finger joint sleeve can be sheathed at the periphery of a finger joint to be rehabilitated, and the finger joint sleeve can be driven by the power actuation of the finger sleeve actuating mechanism to drive the finger joint to be rehabilitated in order to passively bend or stretch; the supporting base includes a profiled shell, with an inner surface of the profiled shell being configured based on the profile of the complete back of a palm or part of the back of the palm, and with the back of the profiled shell being provided with a power fixed base.

8 Claims, 7 Drawing Sheets

(58) Field of Classification Search
CPC ...... A61H 2201/1215; A61H 2201/149; A61H 2201/1638
See application file for complete search history.

(56) References Cited

FOREIGN PATENT DOCUMENTS

| | | | | | |
|---|---|---|---|---|---|
| CN | 106074092 | A | * | 11/2016 | ........... A61H 1/0288 |
| CN | 106943279 | A | * | 7/2017 | ........... A61H 1/0285 |
| CN | 110141458 | A | * | 8/2019 | ........... A61H 1/0288 |

* cited by examiner

EXOSKELETON FINGER REHABILITATION TRAINING DEVICE AND USAGE METHOD THEREOF

TECHNICAL FIELD

The present invention relates to an exoskeleton finger rehabilitation training device and a usage method thereof, and belongs to the field of medical rehabilitation instruments.

BACKGROUND

Cerebral stroke is the main cause of paralysis and dyskinesia for human beings, and the number of patients with dyskinesia caused by cerebral stroke is increasing, and thereby more and more medical resources are consumed. Fingers are important organs for life and work of human beings, and the recovery of hand function of a patient is facilitated by adopting targeted rehabilitation training on the hands.

In conventional finger rehabilitation, a professional physiotherapist helps the patient do finger rehabilitation exercise, which has limitations of poor repeatability, high cost and limited training environment, leading to difficulty in lasting and intensive treatment. The rehabilitation training by an exoskeleton finger rehabilitation training device on the finger helps with the functional rehabilitation of finger.

The existing finger exoskeleton rehabilitation training device has limitations that many positions connecting with fingers bring many restraint on the fingers, and secondary injuries to the fingers are caused by alignment difficulty in rotation center of the fingers and rotation center of the training device due to high degree of freedom of fingers.

The applicant filed Chinese Patent No. CN 109549819 A titled "EXOSKELETON FINGER REHABILITATION TRAINING DEVICE" in 2018. In this application, the rehabilitation training device only has two motors, which gives only one degree of freedom to fingers. Thus rehabilitation exercise has to be performed for four fingers synchronously and less finger postures are allowed during rehabilitation. In addition, in this application, the power structure is located on the inner side of the palm, which causes that the fingers during rehabilitation can not be completely held tightly, leading poor rehabilitation effect. Furthermore, the motion range of MCP (metacarpophalangeal) joints during rehabilitation is from 0 degrees to 70 degrees, and the activity space is limited.

SUMMARY

Aiming at the defects in the prior art, the present invention provides an exoskeleton finger rehabilitation training device in which a power portion thereof is arranged on the back of the palm (outer side of the palm), so that the present invention does not affect the patient's clenching action and can realize complete activity space for the rehabilitation of the patient. In addition, the exoskeleton finger rehabilitation training device is provided with an independent finger rehabilitation training mechanism for each finger, so that the patients have more finger actions during rehabilitation exercise and better rehabilitation effect.

For the above technical purposes, the present invention provides the following technical schemes:

an exoskeleton finger rehabilitation training device comprises an exoskeleton finger rehabilitation training mechanism comprising a supporting base, a finger sleeve actuating mechanism, and a finger joint sleeve connected to a power output end of the finger sleeve actuating mechanism, wherein the finger joint sleeve can be sheathed at the periphery of a finger joint to be rehabilitated, and the finger joint sleeve can be driven by the power actuation of the finger sleeve actuating mechanism to drive the finger joint to be rehabilitated in order to passively bend or stretch; the supporting base comprises a profiled shell, with an inner surface of the profiled shell being configured based on the profile of the complete back of a palm or part of the back of the palm, and with the back of the profiled shell being provided with a power fixed base; a power portion of the finger sleeve actuating mechanism is mounted on the power fixed base; when the finger joint to be rehabilitated performs a rehabilitation exercise, the finger sleeve actuating mechanism is located on the outer side of the palm.

Further, the finger joint sleeve comprises two finger sleeves, namely an intermediate finger joint sleeve and a tail-end finger joint sleeve;

the finger sleeve actuating mechanism comprises a driving motor, a gear transmission mechanism and a rope connecting rod composite transmission mechanism;

the back of the intermediate finger joint sleeve is provided with two transmission sites, namely a transmission site A and a transmission site B; the back of the tail-end finger joint sleeve is provided with a transmission site C;

the gear transmission mechanism comprises a gear shaft b and an arc-shaped internal gear internally meshing with a gear portion of the gear shaft b; two radial section ends of the arc-shaped internal gear are an end A of the arc-shaped internal gear and an end B of the arc-shaped internal gear;

the rope connecting rod composite transmission mechanism comprises a rope and a double connecting rod transmission mechanism;

the base of the driving motor is fixed on the power fixed base;

the gear shaft b is connected with a power output end of the driving motor, the end A of the arc-shaped internal gear is connected with the power fixed base through an L-shaped connecting arm, and the end B of the arc-shaped internal gear is connected with a transmission site A on the intermediate finger joint sleeve; the outer circular surface of the arc-shaped internal gear is guidingly connected with a bearing arranged on the power fixed base;

the transmission site B of the intermediate finger joint sleeve is connected with the transmission site C of the tail-end finger joint sleeve through the double connecting rod transmission mechanism;

the rope is arranged with one end thereof fixed to the end A of the arc-shaped internal gear and the other end thereof sequentially passing along wire grooves formed in a first connecting rod b and a second connecting rod b; the double connecting rod transmission mechanism is coupled to the end A of the arc-shaped internal gear under the traction of the rope.

Further, the finger joint sleeve comprise a forefinger joint sleeve capable of being sheathed at the periphery of a forefinger joint to be rehabilitated, a middle finger joint sleeve capable of being sheathed at the periphery of a middle finger joint to be rehabilitated, a ring finger joint sleeve capable of being sheathed at the periphery of a ring finger joint to be rehabilitated, and a little finger joint sleeve capable of being sheathed at the periphery of a ring finger joint to be rehabilitated;

the finger sleeve actuating mechanism comprises a forefinger sleeve actuating mechanism, a middle finger sleeve actuating mechanism, a ring finger sleeve actuating mechanism and a little finger sleeve actuating mechanism operating independently;

a power output end of the forefinger sleeve actuating mechanism is connected with the forefinger joint sleeve, a power output end of the middle finger sleeve actuating mechanism is connected with the middle finger joint sleeve, a power output end of the ring finger sleeve actuating mechanism is connected with a ring finger joint sleeve, and a power output end of the little finger sleeve actuating mechanism is connected with the little finger joint sleeve;

the power fixed base comprises a four-finger power fixed base, the four-finger power fixed base is arranged at a position adjacent to the four-finger base flush end of the profiled shell, and the four-finger base flush end of the profiled shell can be flush with a section on which a forefinger base, a middle finger base, a ring finger base and a little finger base are located;

the four-finger power fixed base comprises a support, and a forefinger power fixed base, a middle finger power fixed base, a ring finger power fixed base and a little finger power fixed base arranged on the support;

the support is fixed on the back of the profiled shell; the forefinger power fixed base is arranged on the support at a position corresponding to a forefinger base, the middle finger power fixed base is arranged on the support at a position corresponding to a middle finger base, the ring finger power fixed base is arranged on the support at a position corresponding to a ring finger base, and the little finger power fixed base is arranged on the support at a position corresponding to a little finger base;

a power portion of the forefinger sleeve actuating mechanism is arranged on the forefinger power fixed base, a power portion of the middle finger sleeve actuating mechanism is arranged on the middle finger power fixed base, a power portion of the ring finger sleeve actuating mechanism is arranged on the ring finger power fixed base, and a power portion of the little finger sleeve actuating mechanism is arranged on the little finger power fixed base.

Further, the finger joint sleeve further comprises a thumb finger joint sleeve capable of being sheathed at the periphery of a thumb finger joint to be rehabilitated; the finger sleeve actuating mechanism further comprises a thumb finger sleeve actuating mechanism;

a power output end of the thumb finger sleeve actuating mechanism is connected with the thumb finger joint sleeve, and the thumb finger sleeve actuating mechanism and the forefinger finger sleeve actuating mechanism, the middle finger sleeve actuating mechanism, the ring finger sleeve actuating mechanism and the little finger sleeve actuating mechanism operate independently;

the thumb sleeve actuating mechanism comprises a thumb motor and a thumb connecting rod transmission mechanism connected with a power output end of the thumb motor;

the power output end of the thumb motor is provided with a gear shaft a;

the thumb connecting rod transmission mechanism is a double connecting rod mechanism comprising a first connecting rod a and a second connecting rod a, wherein one end of the first connecting rod a is provided with an internal gear so as to mesh with a gear portion of a gear shaft a, the other end of the first connecting rod a is connected with one end of the second connecting rod a, and the other end of the second connecting rod a is hinged with a thumb tail-end sleeve;

the power fixed base also comprises a thumb power fixed base, the thumb power fixed base is fixed on the profiled shell adjacent to the thumb base flush end of the profiled shell, and the thumb base flush end of the profiled shell can be flush with a position on which the thumb base is located; the thumb power fixed base is fixedly provided with a gear shaft a supporting base and a thumb motor fixed base, the thumb motor is fixedly arranged on the thumb motor fixed base, and two ends of the gear shaft a are supported through a supporting hole in the thumb motor fixed base and a supporting hole in the gear shaft a supporting base correspondingly.

Further, each of the forefinger joint sleeve, the middle finger joint sleeve, the ring finger joint sleeve and the little finger joint sleeve comprises an intermediate finger joint sleeve;

each of the forefinger sleeve actuating mechanism, the middle finger sleeve actuating mechanism, the ring finger sleeve actuating mechanism and the little finger sleeve actuating mechanism comprises a driving motor and a gear transmission mechanism;

the back of the intermediate finger joint sleeve is provided with a transmission site A;

the gear transmission mechanism comprises a driving motor, the gear shaft b and the arc-shaped internal gear internally meshing with the gear portion of the gear shaft b; two radial section ends of the arc-shaped internal gear are the end A of the arc-shaped internal gear and the end B of the arc-shaped internal gear;

the gear shaft b is connected with the power output end of the driving motor with the base thereof fixed on the supporting base, the end A of the arc-shaped internal gear is connected with the supporting base through the L-shaped connecting arm, and the end B of the arc-shaped internal gear is connected with a transmission site A on the intermediate finger joint sleeve; the outer circular surface of the arc-shaped internal gear is guidingly connected with a bearing arranged on the supporting base.

Further, each of the forefinger joint sleeve, the middle finger joint sleeve, the ring finger joint sleeve and the little finger joint sleeve comprises two finger joint sleeves, namely an intermediate finger joint sleeve and a tail-end finger joint sleeve;

the back of the intermediate finger joint sleeve is provided with two transmission sites, namely a transmission site A and a transmission site B; the back of the tail-end finger joint sleeve is provided with a transmission site C;

each of the forefinger sleeve actuating mechanism, the middle finger sleeve actuating mechanism, the ring finger sleeve actuating mechanism and the little finger sleeve actuating mechanism is a double finger joint continuous control actuating mechanism and comprises a driving motor, a gear transmission mechanism and a rope connecting rod composite transmission mechanism;

the gear transmission mechanism comprises a driving motor, the gear shaft b and the arc-shaped internal gear internally meshing with the gear portion of the gear shaft b; two radial section ends of the arc-shaped internal gear are the end A of the arc-shaped internal gear and the end B of the arc-shaped internal gear;

the rope connecting rod composite transmission mechanism comprises a rope and a double connecting rod transmission mechanism;

the gear shaft b is connected with the power output end of the driving motor with the base thereof fixed on the supporting base, the end A of the arc-shaped internal gear is connected with the supporting base through the L-shaped connecting arm, and the end B of the arc-shaped internal gear is connected with a transmission site A on the intermediate finger joint sleeve; the outer circular surface of the arc-shaped internal gear is guidingly connected with a bearing arranged on the supporting base;

the transmission site B of the intermediate finger joint sleeve is connected with the transmission site C of the tail-end finger joint sleeve through the double connecting rod transmission mechanism;

the rope is arranged with one end thereof fixed to the end A of the arc-shaped internal gear and the other end thereof sequentially passing along wire grooves formed in the first connecting rod b and the second connecting rod b; the double connecting rod transmission mechanism is coupled to the end A of the arc-shaped internal gear under the traction of the rope.

Further, the double connecting rod transmission mechanism comprises a first connecting rod a and a second connecting rod b; two ends of the first connecting rod b are an end A of the first connecting rod b and an end B of the first connecting rod b; two ends of the second connecting rod b are an end A of the second connecting rod b and an end B of the second connecting rod b;

the end A of the first connecting rod b is hinged with the transmission site B of the intermediate finger joint sleeve, the end B of the first connecting rod b is hinged with the end A of the second connecting rod b, and the end B of the second connecting rod b is hinged with the transmission site C;

the rope passes through the end A of the arc-shaped internal gear, the end A of the first connecting rod b, a hinge point between the first connecting rod b and the second connecting rod b and the end B of second connecting rod b, and is fixed on the first connecting rod b, so that the end A of the first connecting rod b, the hinge point between the first connecting rod b and the second connecting rod b and the end B of second connecting rod b can be coupled to the end A of the arc-shaped internal gear under the traction of the rope.

Further, the support is U-shaped and comprises a cross rod, and a connecting side arm a and a connecting side b symmetrically arranged at two ends of the cross rod, the cross rod is fixed on the back of the profiled shell and is arranged across the four-finger base flush end of the profiled shell, one end of the connecting side arm a or the connecting side arm b is fixed on the cross rod, the other end is idle, and the idle end of the connecting side arm a or the connecting side arm b is provided with a hinge hole;

the forefinger power fixed base is a forefinger motor fixed base, the middle finger power fixed base is a middle finger motor fixed base, the ring finger power fixed base is a ring finger motor fixed base, and the little finger power fixed base is a little finger motor fixed base; the little finger motor fixed base, the ring finger motor fixed base, the forefinger motor fixed base and the middle finger motor fixed base are fixed on the cross rod body; a first gear shaft b supporting base and a third gear shaft b supporting base are sequentially arranged between the little finger motor fixed base and the forefinger motor fixed base, and a second gear shaft b supporting base is arranged between the ring finger motor fixed base and the forefinger motor fixed base;

in the gear transmission mechanism of the forefinger sleeve actuating mechanism, the driving motor is fixed on the forefinger motor fixed base, two ends of the gear shaft b are supported through a supporting hole a of the forefinger motor fixed base and a supporting hole c of the first gear shaft b supporting base, and the arc-shaped internal gear is hinged with an outer side of the hinge hole on the connecting side arm a through the L-shaped connecting arm;

in the gear transmission mechanism of the middle finger sleeve actuating mechanism, the driving motor is fixed on the middle finger motor fixed base, two ends of the gear shaft b are supported through a supporting hole a of the middle finger motor fixed base and a supporting hole e of the second gear shaft b supporting base, and the arc-shaped internal gear is hinged with an inner side of the hinge hole on the connecting side arm a through the L-shaped connecting arm;

in the gear transmission mechanism of the ring finger sleeve actuating mechanism, the driving motor is fixed on the ring finger motor fixed base, two ends of the gear shaft b are supported through a supporting hole a of the ring finger motor fixed base and a supporting hole d of the second gear shaft b supporting base, and the arc-shaped internal gear is hinged with the inner side of the hinge hole on the connecting side arm b through the L-shaped connecting arm;

in the gear transmission mechanism of the little finger sleeve actuating mechanism, the driving motor is fixed on the little finger motor fixed base, two ends of the gear shaft b are supported through a supporting hole a of the little finger motor fixed base and a supporting hole b of the first gear shaft b supporting base, and the arc-shaped internal gear is hinged with the outer side of the hinge hole on the connecting side arm a through the L-shaped connecting arm;

the axis of the gear shaft b of the middle finger sleeve actuating mechanism is arranged collinearly with the axis of the gear shaft b of the ring finger sleeve actuating mechanism, the axis of the gear shaft b of the forefinger sleeve actuating mechanism is arranged collinearly with the axis of the gear shaft b of the little finger sleeve actuating mechanism, and the axis of the gear shaft b of the forefinger sleeve actuating mechanism and the axis of the gear shaft b of the middle finger sleeve actuating mechanism are arranged in parallel and in a staggered manner.

Another technical purpose of the present invention is to provide an exoskeleton finger rehabilitation training method, wherein when a tail-end finger joint of a thumb is required rehabilitation training, a thumb motor of a thumb finger sleeve actuating mechanism is started, power output by the thumb motor is transmitted through a first connecting rod a meshing with a gear shaft a, so that the first connecting rod a is driven to rotate, and then the second connecting rod a drives the thumb tail-end sleeve to act, so that passive rehabilitation exercise of the tail-end finger joint of the thumb is realized;

when a forefinger joint is required rehabilitation training, a forefinger sleeve actuating mechanism is started to drive a forefinger joint sleeve, so that passive rehabilitation of the forefinger joint is realized;

when a middle finger joint is required rehabilitation training, a middle finger sleeve actuating mechanism is started to drive a middle finger joint sleeve, so that passive rehabilitation of the middle finger joint is realized;

when a ring finger joint is required rehabilitation training, a ring finger sleeve actuating mechanism is started to drive a ring finger joint sleeve, so that passive rehabilitation of the ring finger joint is realized;

when a little finger joint is required rehabilitation training, a little finger sleeve actuating mechanism is started to drive a little finger joint sleeve, so that passive rehabilitation of the little finger joint is realized.

Further, each of the forefinger joint sleeve, the middle finger joint sleeve, the ring finger joint sleeve and the little finger joint sleeve comprises two finger joint sleeves, namely an intermediate finger joint sleeve and a tail-end finger joint sleeve;

each of the forefinger sleeve actuating mechanism, the middle finger sleeve actuating mechanism, the ring finger sleeve actuating mechanism and the little finger sleeve actuating mechanism is a double finger joint continuous control actuating mechanism and comprises a gear transmission mechanism and a rope connecting rod composite transmission mechanism;

the double finger joint continuous control actuating mechanism realizes the rehabilitation training of the corresponding finger joint by actuating an intermediate finger joint sleeve and a tail-end finger joint sleeve, and specific steps are as follows:

a driving motor is forward started to drive a gear shaft b to forward rotate, which then turns an arc-shaped internal gear with the opening degree increased relative to the intermediate finger joint sleeve, a double connecting rod transmission mechanism is synchronously driven through a rope, and the intermediate finger joint sleeve and the tail-end finger joint sleeve bear thrust at the moment to force the intermediate finger joint sleeve and the tail-end finger joint sleeve to perform passive stretching rehabilitation exercise;

the driving motor is reversely started to drive the gear shaft b to reversely rotate, which then turns the arc-shaped internal gear with the opening degree decreased relative to the intermediate finger joint sleeve, the double connecting rod transmission mechanism is synchronously driven through the rope, and the intermediate finger joint sleeve and the tail-end finger joint sleeve bear tension at the moment to force the intermediate finger joint sleeve and the tail-end finger joint sleeve to perform passive bending rehabilitation exercise.

According to the above technical schemes, compared with the prior art, the present invention has the following advantages:

1. The supporting base disclosed herein comprises a profiled shell with an inner surface provided with a profiling structure on the back of a palm, and a power portion of a finger sleeve actuating mechanism is fixed through a power fixed base on the back of the profiled shell. When the finger joint to be rehabilitated performs a rehabilitation exercise, the finger sleeve actuating mechanism is located on the outside of the palm, so that the patient's clenching action is not affected during rehabilitation, and a complete activity space for the rehabilitation of the patient can be realized. After the exoskeleton finger rehabilitation training device is tested, the result shows that the motion range of MCP (metacarpophalangeal) joints during rehabilitation is from 0 degrees to 90 degrees, and almost all activity spaces are met; the present invention has high portability, can be changed freely and is not limited by a specific rehabilitation environment.

2. The finger sleeve actuating mechanism comprises a forefinger sleeve actuating mechanism, a middle finger sleeve actuating mechanism, a ring finger sleeve actuating mechanism and a little finger sleeve actuating mechanism operating independently, which means that a forefinger, a middle finger, a ring finger and a little finger are respectively provided with the forefinger sleeve actuating mechanism, the middle finger sleeve actuating mechanism, the ring finger sleeve actuating mechanism and the little finger sleeve actuating mechanism, and the forefinger sleeve actuating mechanism, the middle finger sleeve actuating mechanism, the ring finger sleeve actuating mechanism and the little finger sleeve actuating mechanism operate independently. Therefore, the four fingers in the present invention can independently operate with more finger motions, ensuring better rehabilitation effect.

3. The present invention also provides a corresponding thumb rehabilitation training mechanism (a thumb motor, a thumb connecting rod transmission mechanism and a thumb tail-end sleeve) for a thumb joint; therefore, compared with the existing finger rehabilitation training device, the present invention can also ensure the rehabilitation training on the thumb joint.

4. Each of the forefinger sleeve actuating mechanism, the middle finger sleeve actuating mechanism, the ring finger sleeve actuating mechanism and the little finger sleeve actuating mechanism disclosed herein adopts a gear transmission mechanism with a specific structure to drive an intermediate finger joint sleeve so as to realize the rehabilitation of the intermediate finger joint. The gear transmission mechanism adopts an arc-shaped internal gear, one radial section end of the arc-shaped internal gear is arranged on the supporting base through an L-shaped connecting arm, and the other radial section end of the arc-shaped internal gear is directly connected with the intermediate finger joint sleeve and is guided through a bearing supported on the supporting base. Thereby, the exoskeleton finger rehabilitation training device disclosed herein can meet the requirement that the finger sleeve actuating mechanism is arranged on the outer side of the palm, provides accommodating space of the palm to be rehabilitated, actuates finger joints from the back of the palm without affecting patient's clenching action, and realizes a complete activity space for the rehabilitation of the patient.

5. The double finger joint continuous control actuating mechanism disclosed herein adopts a coupled gear transmission mechanism and a rope connecting rod composite transmission mechanism to drive the intermediate finger joint sleeve and the tail-end finger joint sleeve so as to correspondingly realize the stretching and bending rehabilitation training of the intermediate finger joint (metacarpophalangeal joint, MCP) and the tail-end finger joint (proximal interphalangeal point joint, PIP). In the rope connecting rod composite transmission mechanism, the rope transmission structure is more compact, which ensures no gear gap in conventional mechanical transmission, avoids periodic blocking of the gear transmission during movement, and brings smooth transmission with small damping force; the rope has certain elasticity during rope transmission, so that a buffering effect can be realized on the fingers when the device is wearable, and secondary injuries to the fingers is reduced; the rope transmission can flexibly change the direction and speed of transmission, and is more suitable for a rehabilitation device.

Figure 1:
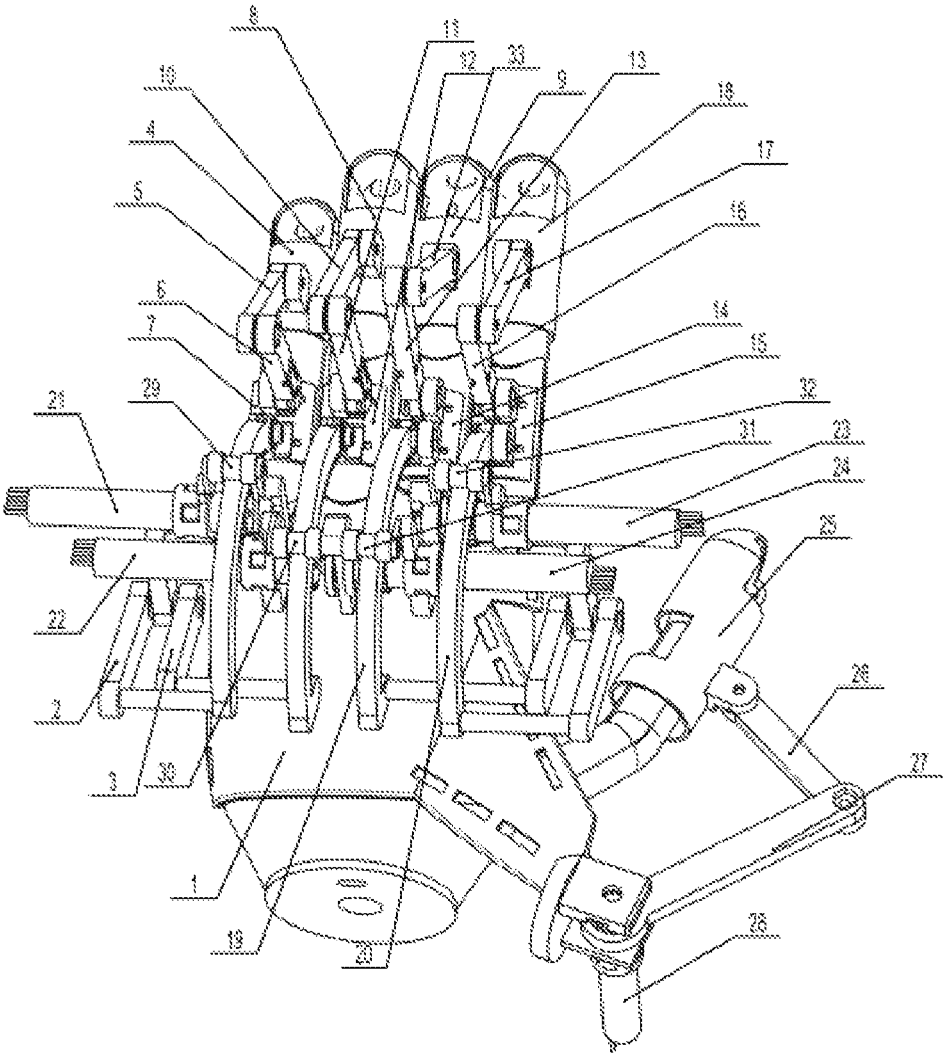
FIG. 1 is a schematic structural diagram of the exoskeleton finger rehabilitation training device according to the present invention.
Figure 2:
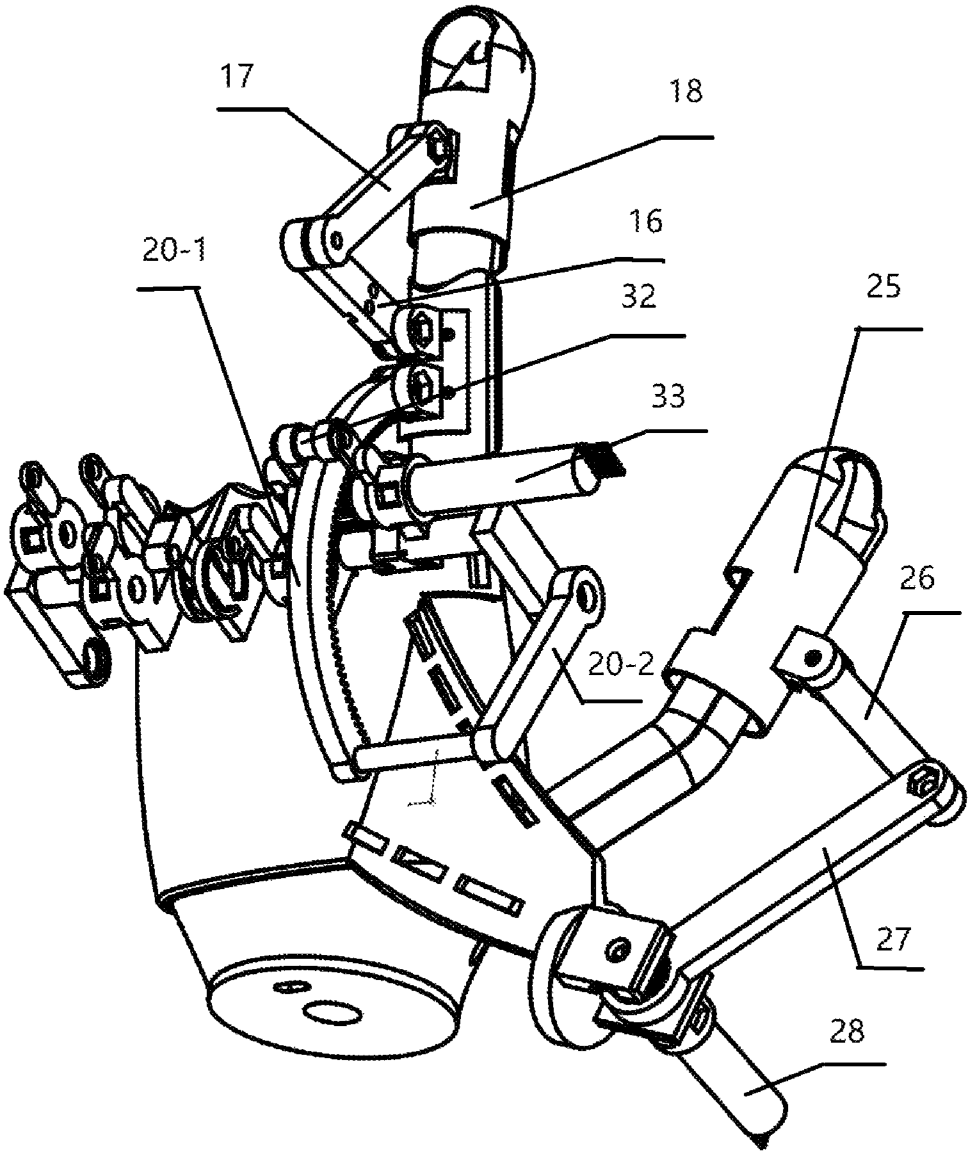
FIG. 2 is a schematic structural diagram of the thumb rehabilitation training mechanism and the forefinger rehabilitation training mechanism correspondingly arranged only on the thumb and the forefinger in FIG. 1.
Figure 3:
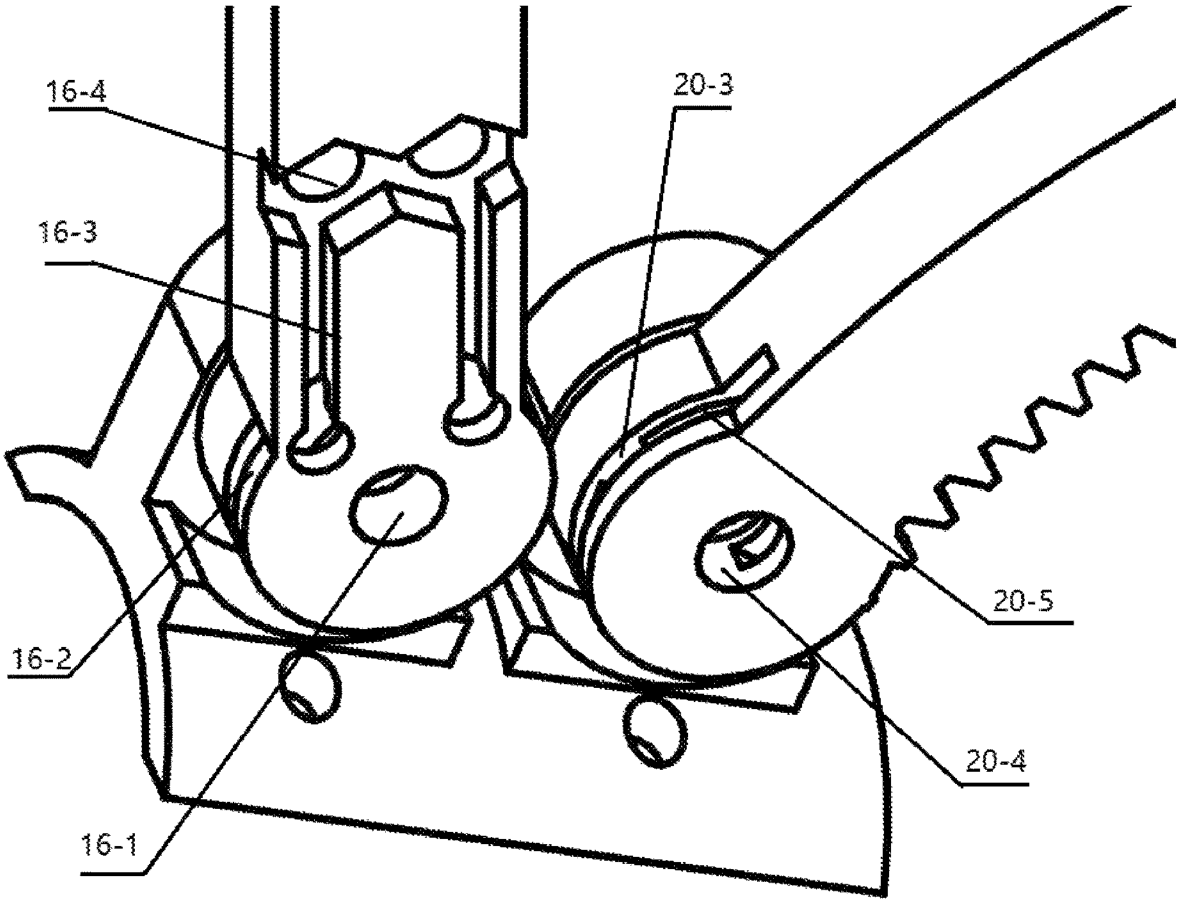
FIG. 3 is a schematic structural diagram (without a rope) of a connection position of an arc-shaped internal gear and a first connecting rod b in the double finger joint rehabilitation training mechanism according to the present invention.
Figure 4:
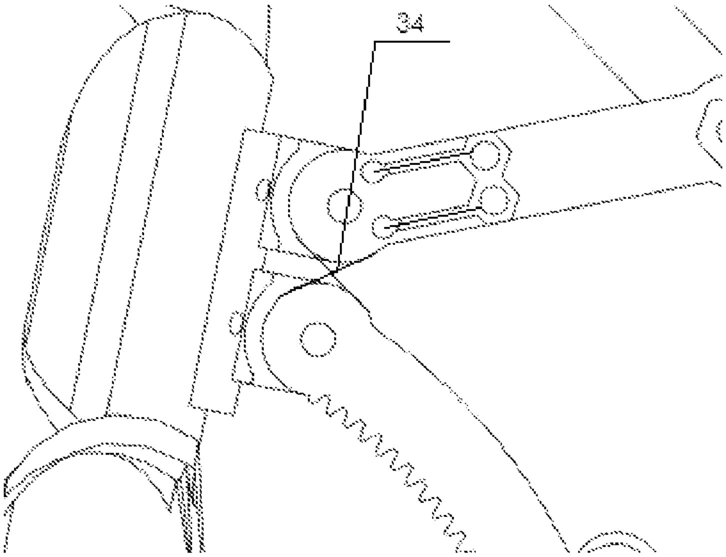
FIG. 4 is a front view of the connection position of the arc-shaped internal gear and the first connecting rod b in the double finger joint rehabilitation training mechanism according to the present invention.
Figure 5:
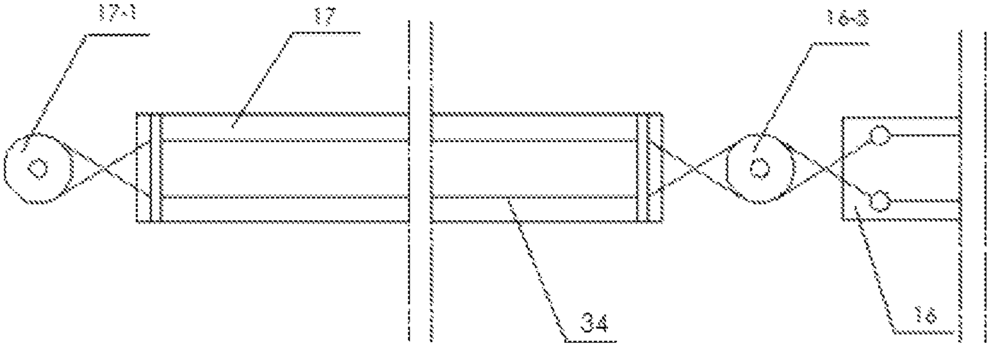
FIG. 5 is a schematic diagram of a rope transmission mechanism between a first connecting rod b and a second connecting rod b (an included angle between the first connecting rod b and the second connecting rod b is a) in the double finger joint rehabilitation training mechanism according to the present invention.
Figure 6:
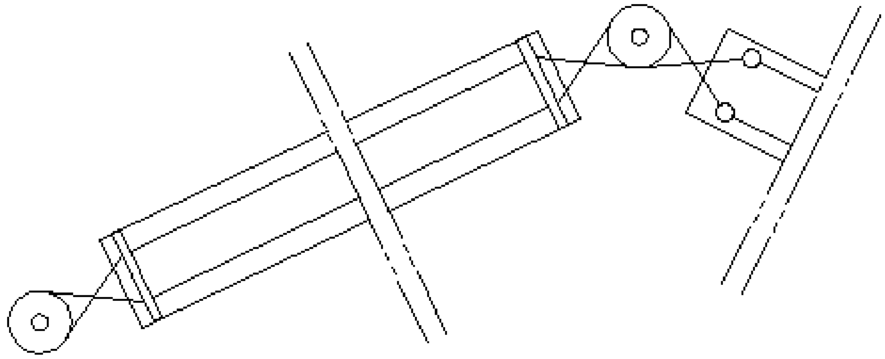
FIG. 6 is a schematic diagram of a rope transmission mechanism between a first connecting rod b and a second connecting rod b (an included angle between the first connecting rod b and the second connecting rod b is (3) in the double finger joint rehabilitation training mechanism according to the present invention.

Reference numbers represent different components in the above FIGS. 1-8, wherein 1 is a supporting base, 1-1 is a profiled shell; 1-2 is a cross rod, 1-3 is a connecting side arm, 1-4 is a hinge hole, 1-5 is a little finger motor fixed base, 1-6 is a ring finger motor fixed base, 1-7 is a middle finger motor fixed base, 1-8 is a forefinger motor fixed base, 1-9 is a little finger bearing supporting base, 1-10 is a ring finger bearing supporting base, 1-11 is a middle finger bearing supporting base, 1-12 is a forefinger bearing supporting base, 1-13 is a first gear shaft b supporting base, 1-14 is a second gear shaft b supporting base, 1-15 is a third gear shaft b supporting base, 1-16 is a thumb power fixed base, 1-17 is a gear shaft a supporting base, 1-18 is a thumb motor fixed base, 2 is a little finger gear, 3 is a ring finger gear, 4 is a little finger tail-end sleeve, 5 is a second connecting rod of a little finger connecting rod transmission mechanism, 6 is a first connecting rod of a little finger connecting rod transmission mechanism, 7 is a little finger intermediate sleeve, 8 is a ring finger tail-end sleeve, 9 is a middle finger tail-end sleeve, 10 is a second connection rod of a ring finger connection rod transmission mechanism, 11 is a first connection rod of a ring finger connection rod transmission mechanism, 12 is a ring finger intermediate sleeve, 13 is a first connection rod of a middle finger connection rod transmission mechanism, 14 is a middle finger intermediate sleeve, 15 is a forefinger intermediate sleeve, 16 is a first connection rod of a forefinger connection rod transmission mechanism, 16-1 is a positioning hole a, 16-2 is an annular rope guide groove b, 16-3 is a linear rope guide groove, 16-4 is a rope fixed hole b, 17 is a second connection rod of a forefinger connection rod transmission mechanism, 18 is a forefinger tail-end sleeve, 19 is a middle finger gear, 20 is a forefinger gear, 20-1 is an arc-shaped internal gear, 20-2 is an L-shaped connecting arm, 20-3 is a rope outlet hole, 20-4 is a rope fixed hole a, 20-5 is an annular rope guide groove a, 21 is a little finger motor, 22 is a ring finger motor, 23 is a forefinger motor, 24 is a middle finger motor, 25 is a thumb tail-end sleeve, 26 is a second connection rod of a thumb connection rod transmission mechanism, 27 is a first connection rod of a thumb connection rod transmission mechanism, 28 is a thumb motor, 29 is a little finger bearing, 30 is a ring finger bearing, 31 is a middle finger bearing, 32 is a forefinger bearing, 33 is a second connection rod of a middle finger connection rod transmission mechanism, and 34 is a rope.

DETAILED DESCRIPTION

The technical schemes in the embodiments of the present invention will be clearly and completely described below with reference to the drawings in the embodiments of the present invention. It is apparent that the described embodiments are only some, but not all, embodiments of the invention. The following description on at least one exemplary embodiment is merely illustrative in nature, and it is not intended to limit the present invention and the application or usage thereof. Based on the embodiments in the present invention, all other embodiments obtained by those of ordinary skill in the art without making any creative effort, fall within the protection scope of the present invention. The relative arrangement of the components and steps, expressions and numerical values described in these embodiments do not limit the scope of the present invention unless it is specifically stated otherwise. Meanwhile, it should be understood that sizes of respective portions shown in the drawings are not drawn in an actual proportional relationship for the convenience of description. Techniques, methods, and apparatus known to one of ordinary skill in the relevant art may not be discussed in detail but are intended to be part of the specification if appropriate. Any particular value in all examples shown and discussed herein should be construed as exemplary only and not as limiting. Thus, other examples of the exemplary embodiments may have different values.

Spatially relative terms, such as “above”, “over”, “on”, “upper”, and the like, may be used herein to describe a spatial relationship between one device or feature and another device or feature as illustrated in the accompanying drawings. It should be understood that the spatially relative terms are intended to encompass different orientations of the device in use or operation in addition to the orientation described in the accompanying drawings. For example, if a device in the accompanying drawings is inverted, the device described as “above” or “on” the other devices or configurations would then be oriented “below” or “under” the other devices or configurations. Thus, the exemplary term “above” can include both an orientation of “above” and “below”. The device may also be positioned in other different ways (rotated 90 degrees or in other orientations).

As shown in FIGS. 1-8, the exoskeleton finger rehabilitation training device disclosed herein comprises an exoskeleton finger rehabilitation training mechanism comprising a supporting base 1, a finger sleeve actuating mechanism, and a finger joint sleeve connected to a power output end of the finger sleeve actuating mechanism, wherein the finger joint sleeve can be sheathed at the periphery of a finger joint to be rehabilitated, and the finger joint sleeve can be driven by the power actuation of the finger sleeve actuating mechanism to drive the finger joint to be rehabilitated in order to passively bend or stretch; the finger sleeve actuating mechanism is supported by the supporting base 1, and when the finger joint to be rehabilitated performs a rehabilitation exercise, the finger sleeve actuating mechanism is located on the outer side of the palm.

In order to enable the exoskeleton finger rehabilitation training device to independently train a forefinger, a middle finger, a ring finger and a little finger, the forefinger, the middle finger, the ring finger and the little finger are respectively provided with the forefinger sleeve actuating mechanism, the middle finger sleeve actuating mechanism, the ring finger sleeve actuating mechanism and the little finger sleeve actuating mechanism, and the forefinger sleeve actuating mechanism, the middle finger sleeve actuating mechanism, the ring finger sleeve actuating mechanism and the little finger sleeve actuating mechanism operate independently.

The forefinger rehabilitation training mechanism comprises a forefinger sleeve actuating mechanism and a forefinger joint sleeve connected with a power output end of the forefinger sleeve actuating mechanism; the middle finger rehabilitation training mechanism comprises a middle finger sleeve actuating mechanism and a middle finger joint sleeve connected with a power output end of the middle finger sleeve actuating mechanism; the ring finger rehabilitation training mechanism comprises a ring finger sleeve actuating mechanism and a ring finger joint sleeve connected with a power output end of the ring finger sleeve actuating mechanism; the little finger rehabilitation training mechanism comprises a little finger sleeve actuating mechanism and a little finger joint sleeve connected with a power output end of the little finger sleeve actuating mechanism.

Therefore, the finger sleeve actuating mechanism comprises the forefinger sleeve actuating mechanism, the middle finger sleeve actuating mechanism, the ring finger sleeve actuating mechanism and the little finger sleeve actuating mechanism; the finger joint sleeve comprise the forefinger joint sleeve capable of being sheathed at the periphery of a forefinger joint to be rehabilitated, the middle finger joint sleeve capable of being sheathed at the periphery of a middle finger joint to be rehabilitated, the ring finger joint sleeve capable of being sheathed at the periphery of a ring finger joint to be rehabilitated, and the little finger joint sleeve capable of being sheathed at the periphery of a ring finger joint to be rehabilitated.

In addition, in order to enable a thumb to be subjected to rehabilitation training, the thumb is provided with a thumb sleeve actuating mechanism. The thumb rehabilitation training mechanism is a single finger joint rehabilitation training mechanism and only comprises one finger sleeve, and the finger sleeve is a thumb tail-end sleeve 25 capable of being sheathed at the thumb tail-end joint; in order to adjust the rotation angle of the thumb tail-end sleeve 25, the thumb tail-end sleeve 25 is connected with the power output end of a thumb motor 28 through a thumb connecting rod transmission mechanism. In the accompanying drawings, the base of the thumb motor 28 is mounted on the supporting base 1, and the power output end of the thumb motor 28 is provided with a gear shaft a; the thumb connecting rod transmission mechanism is a double connecting rod mechanism comprising a first connecting rod a (a first connecting rod 27 of the thumb connecting rod transmission mechanism) and a second connecting rod a (a second connecting rod 26 of the thumb connecting rod transmission mechanism); one end of the first connecting rod a is provided with an internal gear so as to mesh with a gear portion of a gear shaft a, the other end of the first connecting rod a is connected with one end of the second connecting rod a, the other end of the second connecting rod a is hinged with the thumb tail-end sleeve 25 (pivoted through a positioning shaft), and thereby the first connecting rod a and the second connecting rod a are connected to form an L-shaped rod. When the thumb motor 28 outputs power, the power is transmitted by meshing of the gear shaft a with the internal gear at the end of the first connecting rod a, so as to drive the first connecting rod a of the thumb connecting rod transmission mechanism to rotate, and then drive the thumb tail-end sleeve 25 to act through the second connecting rod a, so that the passive rehabilitation exercise of the thumb tail-end joint is realized.

In order to realize the arrangement that the finger sleeve actuating mechanism is positioned on the outer side of the palm, the finger sleeve actuating mechanism adopts the following structure:

Each of the forefinger joint sleeve, the middle finger joint sleeve, the ring finger joint sleeve and the little finger joint sleeve comprises an intermediate finger joint sleeve (a little finger intermediate sleeve 7, a ring finger intermediate sleeve 12, a middle finger intermediate sleeve 14 or a forefinger intermediate sleeve 15); each of the forefinger sleeve actuating mechanism, the middle finger sleeve actuating mechanism, the ring finger sleeve actuating mechanism and the little finger sleeve actuating mechanism comprises a gear transmission mechanism; the back of the intermediate finger joint sleeve is provided with a transmission site A; the gear transmission mechanism comprises a driving motor (a little finger motor 21, a ring finger motor 22, a forefinger motor 23 or a middle finger motor 24), a gear shaft b and an arc-shaped internal gear 20-1 internally meshing with a gear portion of the gear shaft b; two radial section ends of the arc-shaped internal gear 20-1 are an end A of the arc-shaped internal gear 20-1 and an end B of the arc-shaped internal gear 20-1; the gear shaft b is connected with the power output end of the driving motor with the base thereof fixed on the supporting base 1, the end A of the arc-shaped internal gear 20-1 is connected with the supporting base 1 through the L-shaped connecting arm, and the end B of the arc-shaped internal gear 20-1 is connected with a transmission site A on the intermediate finger joint sleeve; the outer circular surface of the arc-shaped internal gear 20-1 is guidingly connected with a bearing (a little finger bearing 29, a ring finger bearing 30, a middle finger bearing 31 or a forefinger bearing 32) arranged on the supporting base 1. The arc-shaped internal gear 20-1 and the L-shaped connecting arm jointly form a little finger gear 2, a ring finger gear 3, a middle finger gear 19 or a forefinger gear 20. Therefore, the present invention adopts the arc-shaped internal gear 20-1 and the specific arrangement mode thereof on the supporting base 1, and can provide enough palm accommodating space for finger rehabilitation. The arrangement that the finger sleeve actuating mechanism is arranged on the outer side of the palm, realized in the present invention, does not affect the patient's clenching action during rehabilitation and can realize a complete activity space for the rehabilitation of the patient. Tests show that the motion range of MCP (metacarpophalangeal) joints is from 0 degrees to 90 degrees, and almost all activity spaces are met. The guiding connection of the outer circular surface of the arc-shaped internal gear 20-1 with the bearing arranged on the supporting base 1 can prevent the case that the transmission part of the structure is too large in deformation caused in the operation process due to long distance from the rotation center, causing meshing is not smooth during gear transmission, and reduce resistance effect of the gear transmission.

Certainly, the present invention enables the forefinger tail-end joint, the middle finger tail-end joint, the ring finger tail-end joint and the little finger tail-end joint to be exercised; each of the forefinger rehabilitation training mechanism, the middle finger rehabilitation training mechanism, the ring finger rehabilitation training mechanism and the little finger rehabilitation training mechanism is a double finger joint continuous control rehabilitation training mechanism comprising a double finger joint continuous control actuating mechanism and two finger sleeves, and the two finger sleeves are the tail-end finger joint sleeve (the little finger tail-end sleeve 4, the ring finger tail-end sleeve 8, the middle finger tail-end sleeve or the forefinger tail-end sleeve 18) capable of being sheathed at the tail-end finger joint and the intermediate finger joint sleeve (the little finger intermediate sleeve 7, the ring finger intermediate sleeve 12, the middle finger intermediate sleeve 14 or the forefinger intermediate sleeve 15) capable of being sheathed at the intermediate finger joint; two transmission sites, namely a transmission site a and a transmission site b, are arranged on the intermediate finger joint sleeve; the transmission site a is connected with a driving motor through the gear transmission mechanism, and the transmission site b is connected with the tail-end finger joint sleeve through a rope connecting rod composite transmission mechanism. The driving motor, the gear transmission mechanism and the rope connecting rod composite transmission mechanism form a double finger joint continuous control actuating mechanism.

The gear transmission mechanism comprises a driving motor (a little finger motor 21, a ring finger motor 21, a forefinger motor 23 or a middle finger motor 24), a gear shaft b and an arc-shaped internal gear 20-1 internally meshing with a gear portion of the gear shaft b; the gear shaft b is arranged at a power output end of the driving motor (the little finger motor 21, the ring finger motor 21, the forefinger motor 23 or the middle finger motor 24).

The axis of the gear shaft b of the middle finger sleeve actuating mechanism is arranged collinearly with the axis of the gear shaft b of the ring finger sleeve actuating mechanism, the axis of the gear shaft b of the forefinger sleeve actuating mechanism is arranged collinearly with the axis of the gear shaft b of the little finger sleeve actuating mechanism, and the axis of the gear shaft b of the forefinger sleeve actuating mechanism and the axis of the gear shaft b of the middle finger sleeve actuating mechanism are arranged in parallel and in a staggered manner. When the fingers are stretched, the MCP rotation center of each finger can be approximately considered to be on a straight line. When the fingers stretch, due to the connection between the structure and the fingers by a nylon bandage, the relative position of the hand and the device can be slightly adjusted according to the fact that the rotation center and the actual rotation center are not on the same straight line, so that the rotation center can be coincident with that of the mechanical mechanism, and the effect of reducing unnecessary force on the fingers to be rehabilitated is achieved.

The two ends of the arc-shaped internal gear 20-1 in the arc extending direction are an end A of the arc-shaped internal gear 20-1 and an end B of the arc-shaped internal gear 20-1. The end A of the arc-shaped internal gear 20-1 is hinged with the supporting base 1 through an L-shaped connecting arm (mounted on the supporting base 1 through a positioning shaft), and the end B of the arc-shaped internal gear 20-1 is hinged with a transmission site a. In addition, the inner circular surface of the arc-shaped internal gear 20-1 is provided with gear teeth meshing with the gear portion of the gear shaft b, and the outer circular surface of the arc-shaped internal gear 20-1 is guided through a bearing supported on the supporting base 1.

The rope connecting rod composite transmission mechanism comprises the rope 34, the first connecting rod b (a first connecting rod 6 of the little finger connecting rod transmission mechanism, a first connecting rod 11 of the ring finger connecting rod transmission mechanism, a first connecting rod 13 of the middle finger connecting rod transmission mechanism or a first connecting rod 16 of the forefinger connecting rod transmission mechanism), the second connecting rod b (a second connecting rod 5 of the little finger connecting rod transmission mechanism, a second connecting rod 10 of the ring finger connecting rod transmission mechanism, a second connecting rod 17 of the forefinger connecting rod transmission mechanism or a second connecting rod 33 of the middle finger connecting rod transmission mechanism), wherein:

each of the first connecting rod b and the second connecting rod b is a straight rod; two ends of the first connecting rod b are an end A of the first connecting rod b and an end B of the first connecting rod b; two ends of the second connecting rod b are an end A of the second connecting rod b and an end B of the second connecting rod b;

the end A of the first connecting rod b is hinged with the transmission site b, the end B of the first connecting rod b is hinged with the end A of the second connecting rod b, and the end B of the second connecting rod b is hinged with a transmission site c arranged on the surface of the tail-end finger joint sleeve.

The end B of the arc-shaped internal gear 20-1 is provided with a rope fixed hole a 20-4, which is a blind hole, and the axial direction of which is perpendicular to the arc surface of the arc-shaped internal gear 20-1. The end B of the arc-shaped internal gear 20-1 is provided with two rope outlet holes 20-3 communicated with the rope fixed hole a 20-4 at the position close to the bottom of the rope fixed hole a 20-4, and two rope outlet holes 20-3 are provided for allowing two ends of a rope to pass through, so that part of the rope passes through the bottom of the rope fixed hole a 20-4 at the moment. Therefore, the rope can be fixed at the end B of the arc-shaped internal gear 20-1 by assembling fastening components such as screws and the like in the rope fixed hole a 20-4. In addition, the end B of the arc-shaped internal gear 20-1 is provided with an annular rope guide groove a 20-5 smoothly extending to the rope outlet hole 20-3 so as to allow two ends of the rope which passes out of the rope outlet hole 20-3 to pass.

The end A of the first connection rod b is provided with a positioning hole a 16-1, so that the first connection rod b is connected with the transmission site b by a locking member assembled in the positioning hole a 16-1. The end A of the first connection rod b is provided with an annular rope guide groove b 16-2 for two ends of the rope passing out of the annular rope guide groove a 20-5 to pass in a cross way. In other words, one end of the rope passing out of the annular rope guide groove a 20-5 passes through the annular rope guide groove a 20-5 in a clockwise direction and the other end thereof passes through the annular rope guide groove a 20-5 in a counterclockwise direction. In addition, the first connection rod b has two linear rope guide grooves 16-3 formed on a surface thereof in parallel with each other to penetrate through the two ends of the annular rope guide groove b 16-2, and the rope fixed hole b is formed at an end of the linear rope guide groove 16-3, so that the rope is fixed to the first connection rod b by assembling fastening components such as screws and the like into the rope fixed hole b after the rope passes out of the rope fixed hole b.

After being arranged along the wire groove arranged on the first connecting rod b, the rope passing through the rope fixed hole b firstly passes through the annular rope guide groove c arranged on the outside of the rotating shaft at the hinged position of the first connecting rod b and the second connecting rod b, and then is arranged along the wire groove arranged on the second connecting rod b, and finally is housed in the annular rope guide groove d arranged on the periphery of the rotating shaft at the hinged position of the second connecting rod b and the tail-end finger joint sleeve.

In short, the rope is arranged with one end thereof fixed to the end A of the arc-shaped internal gear 20-1 and the other end thereof sequentially passes along wire grooves formed in the first connecting rod b and the second connecting rod b; the double connecting rod transmission mechanism is coupled to the end A of the arc-shaped internal gear 20-1 under the traction of the rope.

In order to enable the end A of the first connecting rod b, the hinge point between the first connecting rod b and the second connecting rod b and the end B of the second connecting rod B to be coupled to the end A of the arc-shaped internal gear 20-1 under the traction of the rope, the rope passes through the end A of the arc-shaped internal gear 20-1, the end A of the first connecting rod b, the hinge point between the first connecting rod b and the second connecting rod b and the end B of the second connecting rod b and is fixed on the first connecting rod b.

Therefore, in the rope connecting rod composite transmission mechanism disclosed herein, the double connecting rod mechanism composed of the first connecting rod b and the second connecting rod b functions as the "skeleton" of the transmission mechanism, and the rope functions as the "muscle" of transmission mechanism. The combination of the double connecting rod mechanism and the rope ensures that the driving motor drives the arc-shaped internal gear 20-1 to rotate relative to the intermediate finger joint sleeve, and the driving power is transmitted to the tail-end finger joint sleeve under the traction of the rope.

Figure 7:
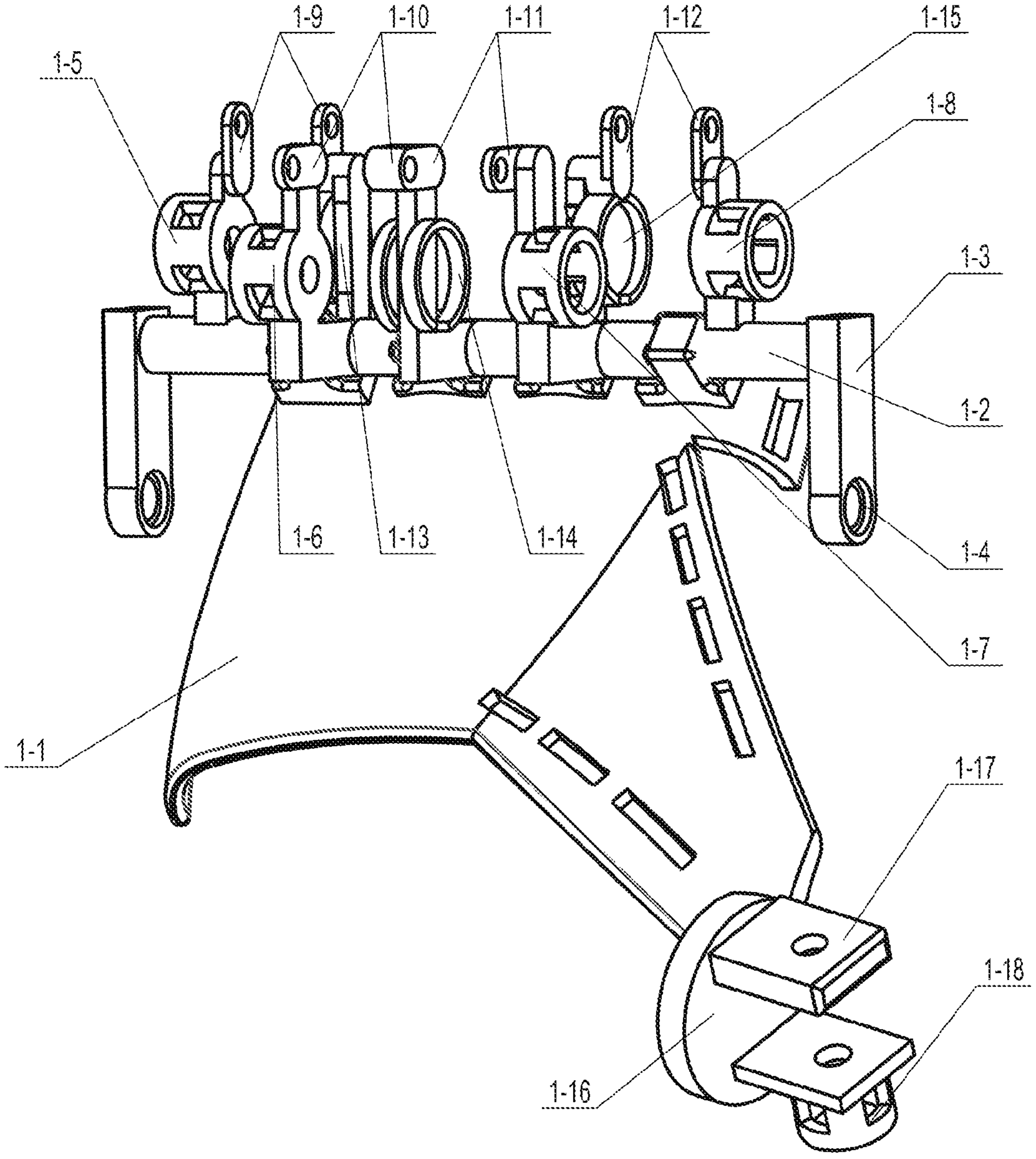
FIG. 7 is a schematic structural diagram of the supporting base according to the present invention.
Figure 8:
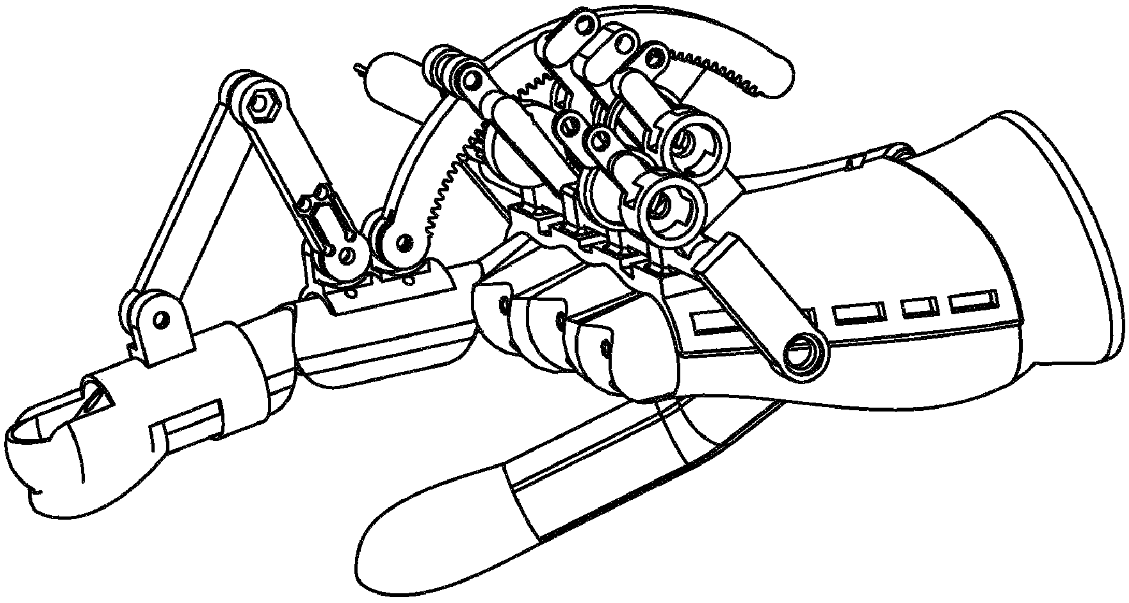
FIG. 8 is a schematic structural diagram of rehabilitation training for forefinger when the forefinger rehabilitation training mechanism is only arranged on the forefinger according to the present invention.

As shown in FIG. 7, the finger rehabilitation training device disclosed herein can perform rehabilitation training on the thumb, the forefinger, the middle finger, the ring finger and the little finger, so the supporting base comprises the profiled shell 1-1, a four-finger power fixed base and a thumb power fixed base 1-16, wherein the shape of the profiled shell 1-1 is designed to imitate the shape of the back of a complete palm; the profiled shell comprises three end surfaces, a first end is a wrist adjacent end that can be adjacent to the wrist position, a second end is a thumb base flush end that can be flush with the thumb base position, and a third end is a four-finger base flush end that can be flush with the forefinger base position, the middle finger base position, the ring finger base position and the little finger base position, namely flush with a section on which the four-finger base is located.

The profiled shell 1-1 is provided with a four-finger power fixed base fixed at the position adjacent to the four-finger base flush end, and is provided with a thumb power fixed base 1-16 fixed at the position adjacent to the thumb base flush end.

The thumb power fixed bases 1-16 are provided with the gear shaft a supporting base 1-17 and the thumb motor fixed base 1-18 fixed thereon; the thumb motor is arranged on the thumb motor fixed base 1-18 fixed thereon, and the gear shaft a connected with the power output end of the thumb motor is supported through the supporting hole in the thumb motor fixed base 1-18 and the supporting hole in the gear shaft a supporting base.

The four-finger power fixed base is arranged in a U shape and comprises a cross rod 1-2 and two connecting side arms 1-3 (a connecting side arm a and a connecting side arm b). The cross rod 1-2 is arranged across the section of the four-finger base flush end of the palm, one end of each connecting side arm 1-3 is fixed to the cross rod 1-2, and the other end thereof is idle. The idle end of each connecting side arm 1-3 is provided with a hinge hole 1-4.

A little finger motor fixed base 1-5, a ring finger motor fixed base 1-6, a forefinger motor fixed base 1-8 and a middle finger motor fixed base 1-7 are fixed on the rod body of the cross rod 1-2; a first gear shaft b supporting base 1-13 and a third gear shaft b supporting base 15 are sequentially arranged between the little finger motor fixed base 1-5 and the forefinger motor fixed base 1-8, and a second gear shaft b supporting base 1-14 is arranged between the ring finger motor fixed base 1-6 and the forefinger motor fixed base 1-8, wherein:

each of the small finger motor fixed base 1-5, the ring finger motor fixed base 1-6, the forefinger motor fixed base 1-8 and the middle finger motor fixed base 1-7 is provided with the supporting hole a of the gear shaft b; the first gear shaft b supporting base 1-13 is provided with a supporting hole b at the position corresponding to a supporting hole a of the little finger motor fixed base 1-5, and the third gear shaft b supporting base 15 is provided with a supporting hole c at the position corresponding to a supporting hole a of the forefinger motor fixed base 1-8; a supporting hole d and a supporting hole e are arranged on the second gear shaft b supporting base 1-14 in a back-to-back manner, the supporting hole d of the second gear shaft b supporting base 1-14 corresponds to the supporting hole a of the ring finger motor fixed base 1-6, and the supporting hole e of the second gear shaft b supporting base 1-14 corresponds to the supporting hole a of the middle finger motor fixed bases 1-7;

therefore, the little finger motor is fixed through the little finger motor fixed base 1-5, and the gear shaft b fixed to the power output end of the little finger motor is supported through the supporting hole a of the little finger motor fixed base 1-5 and the supporting hole b of the first gear shaft b supporting base 1-13; the forefinger motor is fixed through the forefinger motor fixed base 1-8, and a gear shaft b fixed to the power output end of the forefinger motor is supported through the supporting hole a of the forefinger motor fixed base 1-8 and the supporting hole c of the second gear shaft b supporting base 1-14; the ring finger motor is fixed through the ring finger motor fixed base 1-6, and the gear shaft b fixed to the power output end of the ring finger motor is supported through the supporting hole a of the ring finger motor fixed base 1-6 and the supporting hole d of the third gear shaft b supporting base 15; the middle finger motor is fixed through the middle finger motor fixed base 1-7, and the gear shaft b fixed to the power output end of the middle finger motor is supported through the supporting hole a of the middle finger motor fixed base 1-7 and the supporting hole e of the third gear shaft b supporting base 15. Certainly, in the present invention, the gear shaft b fixed to the power output end of the driving motors (the little finger motor, the forefinger motor, the ring finger motor and the middle finger motor) can also be arranged in a cantilever way, and at the moment, the cross rod disclosed herein does not need to be provided with the first gear shaft b supporting base 1-13, the second gear shaft b supporting base 1-14 and the third gear shaft b supporting base 15; or the arranged first gear shaft b supporting base 1-13, second gear shaft b supporting base 1-14 and third gear shaft b supporting base 15 are used for other purposes, for example, are arranged with non-contact angle sensors in the supporting hole b of the first gear shaft b supporting base 1-13, the supporting hole c of the second gear shaft b supporting base 1-14 and the supporting hole d/e of the third gear shaft b supporting base 15 respectively, so as to determine the angle of each corresponding driving motor in real time and obtain angle data of each finger.

In addition, in the present invention, the little finger motor fixed base 1-5, the first gear shaft b supporting base 1-13, the third gear shaft b supporting base 15 and the middle finger motor fixed base 1-7 are fixed to the cross rod 1-2 through a connecting block a parallel to the Y direction (upward direction in FIG. 7) of the cross rod 1-2; the ring finger motor fixed base 1-6, the second gear shaft b supporting base 1-14 and the forefinger motor fixed base 1-8 are fixed to the cross rod 1-2 through a connecting block b parallel to the Z direction (the direction perpendicular to the Y direction of the cross rod 1-2, and the direction of the plane in which the X direction of the cross-bar 1-2 is located in FIG. 7, wherein, the X direction of the cross rod 1-2 is the extending direction of the cross rod 1-2) of the cross rod 1-2. Therefore, with such an arrangement in the present invention, the motor fixed hole of the little finger motor fixed base 1-5 and the motor fixed hole of the middle finger motor fixed base 1-7 are arranged collinearly (the axes are in the same straight line and are parallel to the cross rod 1-2); and the motor fixed hole of the ring finger motor fixed base 1-6 and the motor fixed hole of the forefinger motor fixed base 1-8 are arranged collinearly (the axes are in the same straight line and are parallel to the cross rod 1-2).

Furthermore, in the present invention, the L-shaped connecting arm of the little finger gear and the L-shaped connecting arm of the ring finger gear are hinged with the hinge hole 1-4 at the end of the same connecting side arm 1-3 (the connecting side arm 1-3*a*), the L-shaped connecting arm of the little finger gear is positioned at the outside of the connecting side arm 1-3 (the connecting side arm 1-3*a*), and the L-shaped connecting arm of the ring finger gear is positioned at the inside of the connecting side arm 1-3 (the connecting side arm 1-3*a*).

The L-shaped connecting arm of the middle finger gear and the L-shaped connecting arm of the forefinger gear are also hinged with the hinge hole 1-4 at the end of the same connecting side arm 1-3 (the connecting side arm 1-3*b*), the L-shaped connecting arm of the forefinger gear is positioned at the outside of the connecting side arm 1-3 (the connecting side arm 1-3*a*), and the L-shaped connecting arm of the middle finger gear is positioned at the inside of the connecting side arm 1-3 (the connecting side arm 1-3*a*).

Each of the little finger motor fixed base 1-5, the ring finger motor fixed base 1-6, the middle finger motor fixed base 1-7, the forefinger motor fixed base 1-8, the first gear shaft b supporting base 1-13, the second gear shaft b supporting base 1-14 and the third gear shaft b supporting base 1-15 is provided with a mounting end lugs, and then the mounting end lug of the little finger motor fixed base 1-5 and the mounting end lug of the first gear shaft b supporting base 1-13 form a little finger bearing supporting base 1-9 for mounting a little finger bearing; the mounting end lug of the ring finger motor fixed base 1-6 and the mounting end lug of the third gear shaft b supporting base 1-14 form a ring finger bearing supporting base 1-10 for mounting a ring finger bearing; the mounting end lug of the middle finger motor fixed base 1-7 and the mounting end lug of the third gear shaft b supporting base 1-14 form a middle finger bearing supporting base 1-11 for mounting a middle finger bearing; the mounting end lug of the forefinger motor fixed base 1-8 and the mounting end lug of the third gear shaft b supporting base 1-14 form a forefinger bearing supporting base 1-12 for mounting a forefinger bearing.

Based on the rehabilitation training device described above, the working principle of the present invention is as follows:

when a tail-end finger joint of a thumb is required rehabilitation training, a thumb motor 28 of a thumb finger sleeve actuating mechanism is started, power output by the thumb motor 28 is transmitted through a first connecting rod a meshing with a gear shaft a, so that the first connecting rod a is driven to rotate, and then the second connecting rod a drives the thumb tail-end sleeve 25 to act, so that passive rehabilitation exercise of the tail-end finger joint of the thumb is realized;

when a forefinger joint is required rehabilitation training, a forefinger sleeve actuating mechanism is started to drive a forefinger joint sleeve, so that passive rehabilitation of the forefinger joint is realized;

when a middle finger joint is required rehabilitation training, a middle finger sleeve actuating mechanism is started to drive a middle finger joint sleeve, so that passive rehabilitation of the middle finger joint is realized;

when a ring finger joint is required rehabilitation training, a ring finger sleeve actuating mechanism is started to drive a ring finger joint sleeve, so that passive rehabilitation of the ring finger joint is realized;

when a little finger joint is required rehabilitation training, a little finger sleeve actuating mechanism is started to drive a little finger joint sleeve, so that passive rehabilitation of the little finger joint is realized.

Each of the forefinger joint sleeve, the middle finger joint sleeve, the ring finger joint sleeve and the little finger joint sleeve comprises two finger joint sleeves, namely an intermediate finger joint sleeve and a tail-end finger joint sleeve; each of the forefinger sleeve actuating mechanism, the middle finger sleeve actuating mechanism, the ring finger sleeve actuating mechanism and the little finger sleeve actuating mechanism is a double finger joint continuous control actuating mechanism and comprises a gear transmission mechanism and a rope connecting rod composite transmission mechanism;

therefore, the double finger joint continuous control actuating mechanism realizes the rehabilitation training of the corresponding finger joint by actuating an intermediate finger joint sleeve and a tail-end finger joint sleeve, and specific steps are as follows:

a driving motor is forward started to drive a gear shaft b to forward rotate, which then turns an arc-shaped internal gear 20-1 with the opening degree increased relative to the intermediate finger joint sleeve, a double connecting rod transmission mechanism is synchronously driven through a rope, and the intermediate finger joint sleeve and the tail-end finger joint sleeve bear thrust (pressure) at the moment to force the intermediate finger joint sleeve and the tail-end finger joint sleeve to perform passive stretching rehabilitation exercise;

the driving motor is reversely started to drive the gear shaft b to reversely rotate, which then turns the arc-shaped internal gear 20-1 with the opening degree decreased relative to the intermediate finger joint sleeve, the double connecting rod transmission mechanism is synchronously driven through the rope, and the intermediate finger joint sleeve and the tail-end finger joint sleeve bear tension at the moment to force the intermediate finger joint sleeve and the tail-end finger joint sleeve to perform passive bending rehabilitation exercise.

What is claimed is:

1. An exoskeleton finger rehabilitation training device, comprising an exoskeleton finger rehabilitation training mechanism, wherein the exoskeleton finger rehabilitation training mechanism comprises a supporting base, a finger sleeve actuation mechanism, and a plurality of finger joint sleeves connected to a power output end of the finger sleeve actuation mechanism, wherein each of the plurality of finger joint sleeves is sheathed at a respective periphery of a respective finger joint to be rehabilitated, and each of the plurality of finger joint sleeves is driven by a power actuation of the finger sleeve actuation mechanism to drive the respective finger joint to be rehabilitated in order to passively bend or stretch; the supporting base comprises a profiled shell, with an inner surface of the profiled shell being configured based on a profile of a complete back of a palm or part of a back of the palm, and with a back of the profiled shell being provided with a power fixed base;

a power portion of the finger sleeve actuation mechanism is mounted on the power fixed base;

when the respective finger joint to be rehabilitated performs a rehabilitation exercise, the finger sleeve actuation mechanism is located on an outer side of the palm;

wherein the finger sleeve actuation mechanism comprises a driving motor, a gear transmission mechanism and a rope connecting rod composite transmission mechanism;

a back of an intermediate finger joint sleeve within the plurality of finger joint sleeves is provided with a first transmission site and a second transmission site; a back of a tail-end finger joint sleeve within the plurality of finger joint sleeves is provided with a third transmission site;

the gear transmission mechanism comprises a first gear shaft and an arc-shaped internal gear internally meshing with a gear portion of the first gear shaft; two radial section ends of the arc-shaped internal gear are a first end of the arc-shaped internal gear and a second end of the arc-shaped internal gear;

the rope connecting rod composite transmission mechanism comprises a rope and a double connecting rod transmission mechanism;

a base of the driving motor is fixed on the power fixed base;

wherein the first gear shaft is connected with a power output end of the driving motor, the first end of the arc-shaped internal gear is connected with the power fixed base through an L-shaped connecting arm, and the second end of the arc-shaped internal gear is connected with the first transmission site on the intermediate finger joint sleeve; an outer circular surface of the arc-shaped internal gear is guidingly connected with a bearing arranged on the power fixed base;

the second transmission site of the intermediate finger joint sleeve is connected with the third transmission site of the tail-end finger joint sleeve through the double connecting rod transmission mechanism; and the rope is arranged with one end thereof fixed to the first end of the arc-shaped internal gear and the other end thereof sequentially passage along wire grooves formed in a first connecting rod and a second connecting rod; the double connecting rod transmission mechanism is coupled to the first end of the arc-shaped internal gear under traction of the rope.

2. The exoskeleton finger rehabilitation training device according to claim 1, wherein the finger sleeve actuation mechanism comprises a forefinger sleeve actuation mechanism, a middle finger sleeve actuation mechanism, a ring finger sleeve actuation mechanism and a little finger sleeve actuation mechanism operating independently;

a power output end of the forefinger sleeve actuation mechanism is connected with a forefinger joint sleeve being sheathed at a periphery of a forefinger joint to be rehabilitated, a power output end of the middle finger sleeve actuation mechanism is connected with the middle finger joint sleeve being sheathed at a periphery of a middle finger joint to be rehabilitated, a power output end of the ring finger sleeve actuation mechanism is connected with a ring finger joint sleeve being sheathed at a periphery of a ring finger joint to be rehabilitated, and a power output end of the little finger sleeve actuation mechanism is connected with a little finger joint sleeve being sheathed at a periphery of a ring finger joint to be rehabilitated;

the power fixed base further comprises a four-finger power fixed base, the four-finger power fixed base is arranged at a position adjacent to the four-finger base flush end of the profiled shell, and the four-finger base flush end of the profiled shell is flush with a section on which a forefinger base, a middle finger base, a ring finger base and a little finger base are located;

the four-finger power fixed base comprises a support, and a forefinger power fixed base, a middle finger power fixed base, a ring finger power fixed base and a little finger power fixed base arranged on the support;

the support is fixed on the back of the profiled shell; the forefinger power fixed base is arranged on the support at a position corresponding to the forefinger base, the middle finger power fixed base is arranged on the support at a position corresponding to the middle finger base, the ring finger power fixed base is arranged on the support at a position corresponding to the ring finger base, and the little finger power fixed base is arranged on the support at a position corresponding to the little finger base;

a power portion of the forefinger sleeve actuation mechanism is arranged on the forefinger power fixed base, a power portion of the middle finger sleeve actuation mechanism is arranged on the middle finger power fixed base, a power portion of the ring finger sleeve actuation mechanism is arranged on the ring finger power fixed base, and a power portion of the little finger sleeve actuation mechanism is arranged on the little finger power fixed base.

3. The exoskeleton finger rehabilitation training device according to claim 2, wherein the plurality of finger joint sleeves further comprises a thumb finger joint sleeve capable of being sheathed at the periphery of a thumb finger joint to be rehabilitated; the finger sleeve actuation mechanism further comprises a thumb finger sleeve actuation mechanism;

a power output end of the thumb finger sleeve actuation mechanism is connected with the thumb finger joint sleeve, and the thumb finger sleeve actuation mechanism and the forefinger finger sleeve actuation mechanism, the middle finger sleeve actuation mechanism, the ring finger sleeve actuation mechanism and the little finger sleeve actuation mechanism operate independently;

the thumb sleeve actuation mechanism comprises a thumb motor and a thumb connecting rod transmission mechanism connected with a power output end of the thumb motor;

the power output end of the thumb motor is provided with a second gear shaft a;

the thumb connecting rod transmission mechanism is a double connecting rod mechanism comprising a third connecting rod and a fourth connecting rod, wherein one end of the third connecting rod is provided with an internal gear so as to mesh with a gear portion of a second gear shaft, the other end of the third connecting rod is connected with one end of the fourth connecting rod, and the other end of the fourth connecting rod is hinged with a thumb tail-end sleeve;

the power fixed base also comprises a thumb power fixed base, the thumb power fixed base is fixed on the profiled shell adjacent to the thumb base flush end of the profiled shell, and the thumb base flush end of the profiled shell is flush with a position on which the thumb base is located; the thumb power fixed base is fixedly provided with a second gear shaft a supporting base and a thumb motor fixed base, the thumb motor is fixedly arranged on the thumb motor fixed base, and two ends of the gear shaft a are supported through supporting hole in the thumb motor fixed base and a supporting hole in the second gear shaft a supporting base correspondingly.

4. The exoskeleton finger rehabilitation training device according to claim 2, wherein each of the forefinger joint sleeve, the middle finger joint sleeve, the ring finger joint sleeve and the little finger joint sleeve comprises the intermediate finger joint sleeve;

each of the forefinger sleeve actuation mechanism, the middle finger sleeve actuation mechanism, the ring finger sleeve actuation mechanism and the little finger sleeve actuation mechanism comprises a driving motor and a gear transmission mechanism;

a back of each of the intermediate finger joint sleeves is provided with the first transmission site;

each of the gear transmission mechanisms comprises the first gear shaft and the arc-shaped internal gear internally meshing with the gear portion of the first gear shaft; the two radial section ends of the arc-shaped internal gear are the first end of the arc-shaped internal gear and the second end of the arc shaped internal gear;

the first gear shaft is connected with the power output end of the driving motor with the base thereof fixed on the supporting base, the first end of the arc-shaped internal gear is connected with the supporting base through the L-shaped connecting arm, and the second end of the arc shaped internal gear is connected with the first transmission site on the intermediate finger joint sleeve; the outer circular surface of the arc-shaped internal gear is guidingly connected with the bearing arranged on the supporting base.

5. The exoskeleton finger rehabilitation training device according to claim 4, wherein the support is U-shaped and comprises a cross rod, and a connecting side arm a and a connecting side b symmetrically arranged at two ends of the cross rod, the cross rod is fixed on the back of the profiled shell and is arranged across the four-finger base flush end of the profiled shell, one end of the connecting side arm a or the connecting side arm b is fixed on the cross rod, the other end is idle, and the idle end of the connecting side arm a or a connecting side arm b is provided with a hinge hole;

the forefinger power fixed base is a forefinger motor fixed base, the middle finger power fixed base is a middle finger motor fixed base, the ring finger power fixed base is a ring finger motor fixed base, and the little finger power fixed base is a little finger motor fixed base; the little finger motor fixed base, the ring finger motor fixed base, the forefinger motor fixed base and the middle finger motor fixed base are fixed on the cross rod body; a first gear shaft supporting base and a third gear shaft supporting base are sequentially arranged between the little finger motor fixed base and the forefinger motor fixed base, and a second gear shaft supporting base is arranged between the ring finger motor fixed base and the forefinger motor fixed base;

in the gear transmission mechanism of the forefinger sleeve actuation mechanism, the driving motor is fixed on the forefinger motor fixed base, two ends of the first gear shaft are supported through a first supporting hole a of the forefinger motor fixed base and a second supporting hole of the first gear shaft supporting base, and the arc-shaped internal gear is hinged with an outer side of the hinge hole on the connecting side arm through the L-shaped connecting arm;

in the gear transmission mechanism of the middle finger sleeve actuation mechanism, the driving motor is fixed on the middle finger motor fixed base, the two ends of the first gear shaft are supported through a first supporting hole a of the middle finger motor fixed base and a second supporting hole e of the second gear shaft supporting base, and the arc-shaped internal gear is hinged with an inner side of the hinge hole on the connecting side arm a through the L-shaped connecting arm;

in the gear transmission mechanism of the ring finger sleeve actuation mechanism, the driving motor is fixed on the ring finger motor fixed base, the two ends of the gear shaft are supported through a first supporting hole a of the ring finger motor fixed base and a second supporting hole of the second gear shaft supporting base, and the arc-shaped internal gear is hinged with the inner side of the hinge hole on the connecting side arm through the L-shaped connecting arm;

in the gear transmission mechanism of the little finger sleeve actuation mechanism, the driving motor is fixed on the little finger motor fixed base, the two ends of the gear shaft are supported through a first supporting hole of the little finger motor fixed base and a second supporting hole of the first gear shaft supporting base, and the arc-shaped internal gear is hinged with the outer side of the hinge hole on the connecting side arm through the L shaped connecting arm;

an axis of the gear shaft of the middle finger sleeve actuation mechanism is arranged collinearly with an axis of the first gear shaft of the ring finger sleeve actuation mechanism, an axis of the first gear shaft of the forefinger sleeve actuation mechanism is arranged collinearly with an axis of the first gear shaft of the little finger sleeve actuation mechanism, and an axis of the gear shaft of the forefinger sleeve actuation mechanism and an axis of the first gear shaft of the middle finger sleeve actuation mechanism are arranged in parallel and in a staggered manner.

6. The exoskeleton finger rehabilitation training device according to claim 2, wherein each of the forefinger joint sleeve, the middle finger joint sleeve, the ring finger joint sleeve and the little finger joint sleeve comprises two finger joint sleeves, namely an intermediate finger joint sleeve and a tail-end finger joint sleeve;

the back of each of the intermediate finger joint sleeves is provided with two transmission sites, namely the first transmission site and the second transmission site; the back of each of the tail-end finger joint sleeves is provided with the third transmission site;

each of the forefinger sleeve actuation mechanism, the middle finger sleeve actuation mechanism, the ring finger sleeve actuation mechanism and the little finger sleeve actuation mechanism is a double finger joint continuous control actuation mechanism and comprises a driving motor, a gear transmission mechanism and a rope connecting rod composite transmission mechanism;

each of the gear transmission mechanisms comprises a driving motor, the first gear shaft b and the arc shaped internal gear internally meshing with a gear portion of the first gear shaft b; two radial section ends of the arc-shaped internal gear are the first end of the arc-shaped internal gear and the second end of the arc-shaped internal gear;

the rope connecting rod composite transmission mechanism comprises a rope and a double connecting rod transmission mechanism;

the first gear shaft is connected with the power output end of the driving motor with the base thereof fixed on the supporting base, the first end of the arc-shaped internal gear is connected with the supporting base through the L-shaped connecting arm, and the second end of the arc shaped internal gear is connected with the first transmission site A on the intermediate finger joint sleeve; an outer circular surface of the arc-shaped internal gear is guidingly connected with a bearing arranged on the supporting base;

the second transmission site of the intermediate finger joint sleeve is connected with the third transmission site of the tail-end finger joint sleeve through the double connecting rod transmission mechanism;

the rope is arranged with one end thereof fixed to the first end of the arc-shaped internal gear and the other end thereof sequentially passing along wire grooves formed in a first connecting rod and a second connecting rod; the double connecting rod transmission mechanism is coupled to the first end of the arc-shaped internal gear under the traction of the rope.

7. The exoskeleton finger rehabilitation training device according to claim 1, wherein the double connecting rod transmission mechanism comprises the first connecting rod and the second connecting rod; two ends of the first connecting rod are a first end of the first connecting rod and a second end of the first connecting rod; two ends of the second connecting rod are a first end of the second connecting rod and a second end of the second connecting rod;

the first end of the first connecting rod is hinged with the second transmission site of the intermediate finger joint sleeve, the second end of the first connecting rod is hinged with the first end of the second connecting rod, and the second end of the second connecting rod is hinged with the third transmission site;

the rope passes through the first end of the arc-shaped internal gear, the first end of the first connecting rod, a hinge point between the first connecting rod and the second connecting rod and the second end of second connecting rod, and is fixed on the first connecting rod, so that the first end of the first connecting rod, the hinge point between the first connecting rod and the second connecting rod and the second end of second connecting rod is coupled to the first end of the arc-shaped internal gear under the traction of the rope.

8. An exoskeleton finger rehabilitation training method, wherein when a tail-end finger joint of a thumb is required rehabilitation training, a thumb motor of a thumb finger sleeve actuation mechanism is started, power output by the thumb motor is transmitted through a first connecting rod meshing with a first gear shaft, so that the first connecting rod is driven to rotate, and then a second connecting rod drives the thumb tail-end sleeve to act, so that passive rehabilitation exercise of the tail-end finger joint of the thumb is realized;

when a forefinger joint is required rehabilitation training, a forefinger sleeve actuation mechanism is started to drive a forefinger joint sleeve, so that passive rehabilitation of the forefinger joint is realized;

when a middle finger joint is required rehabilitation training, a middle finger sleeve actuation mechanism is started to drive a middle finger joint sleeve, so that passive rehabilitation of the middle finger joint is realized;

when a ring finger joint is required rehabilitation training, a ring finger sleeve actuation mechanism is started to drive a ring finger joint sleeve, so that passive rehabilitation of the ring finger joint is realized;

when a little finger joint is required rehabilitation training, a little finger sleeve actuation mechanism is started to drive a little finger joint sleeve, so that passive rehabilitation of the little finger joint is realized; wherein each of the forefinger joint sleeve, the middle finger joint sleeve, the ring finger joint sleeve and the little finger joint sleeve comprises two finger joint sleeves;

each of the forefinger sleeve actuation mechanism, the middle finger sleeve actuation mechanism, the ring finger sleeve actuation mechanism and the little finger sleeve actuation mechanism is a double finger joint continuous control actuation mechanism and comprises a gear transmission mechanism and a rope connecting rod composite transmission mechanism;

each of the double finger joint continuous control actuation mechanisms realize the rehabilitation training of the corresponding finger joint by actuation of an intermediate finger joint sleeve and a tail-end finger joint sleeve, and specific steps are as follows:

a driving motor is forward started to drive a second gear shaft to forward rotate, which then turns an arc-shaped internal gear with an opening degree increased relative to the intermediate finger joint sleeve, a double connecting rod transmission mechanism is synchronously driven through a rope, and the intermediate finger joint sleeve and the tail-end finger joint sleeve bear thrust at the moment to force the intermediate finger joint sleeve and the tail-end finger joint sleeve to perform passive stretching rehabilitation exercise;

the driving motor is reversely started to drive the second gear shaft to reversely rotate, which then turns the arc-shaped internal gear with the opening degree decreased relative to the intermediate finger joint sleeve, the double connecting rod transmission mechanism is synchronously driven through the rope, and the intermediate finger joint sleeve and the tail-end finger joint sleeve bear tension at the moment to force the intermediate finger joint sleeve and the tail-end finger joint sleeve to perform passive bending rehabilitation exercise.

* * * * *